L. O. FRENCH.
STANCHION.
APPLICATION FILED NOV. 27, 1916.
1,239,783.
Patented Sept. 11, 1917.
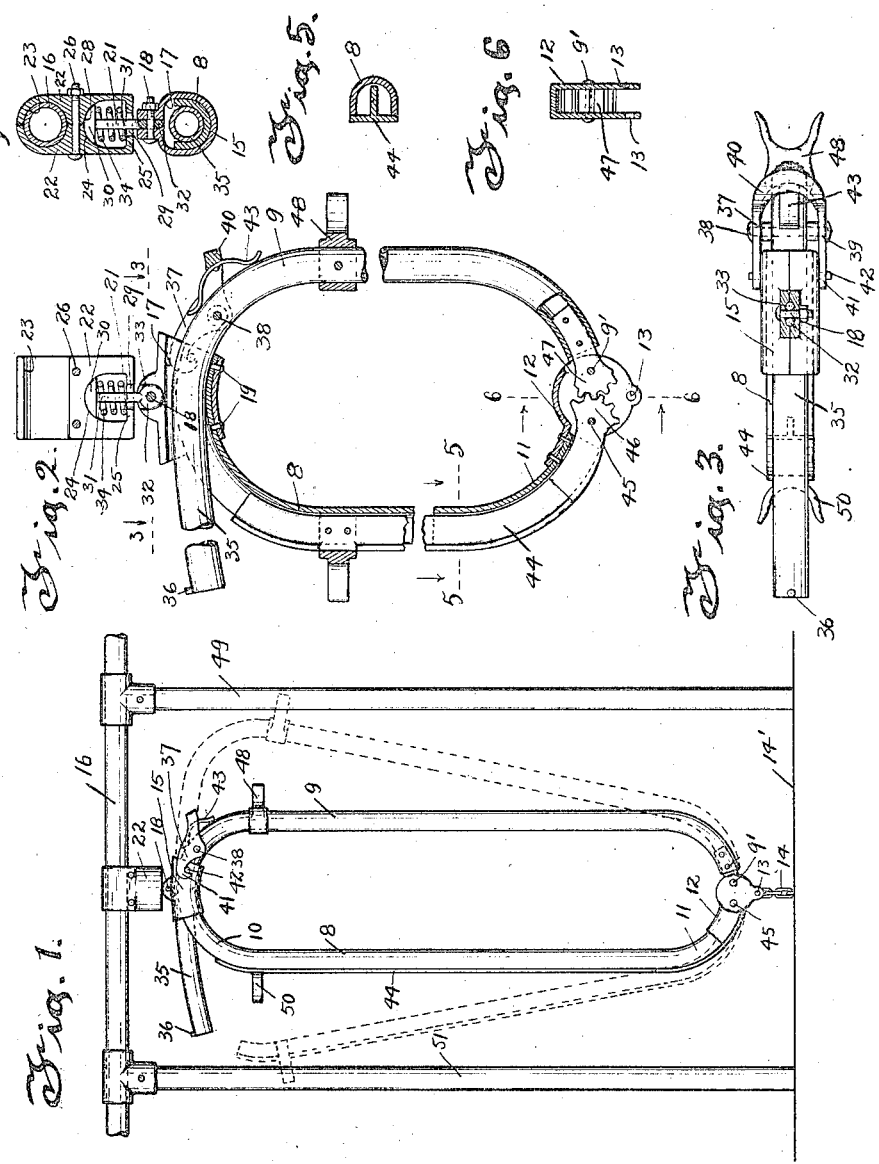
INVENTOR
Louis O. French

UNITED STATES PATENT OFFICE.

LOUIS O. FRENCH, OF MILWAUKEE, WISCONSIN.

STANCHION.

1,239,783.  Specification of Letters Patent.  Patented Sept. 11, 1917.

Application filed November 27, 1916. Serial No. 133,537.

*To all whom it may concern:*

Be it known that I, LOUIS O. FRENCH, a citizen of the United States, and resident of Milwaukee, in the county of Milwaukee and State of Wisconsin, have invented new and useful Improvements in Stanchions, of which the following is a description, reference being had to the accompanying drawings, which are a part of this specification.

This invention relates to stanchions.

The invention is designed to provide a new and improved form of stanchion together with a movable guard carried by the stanchion and simultaneously movable with the side bar thereof.

Heretofore it has been the practice to provide either the relatively immovable side bar of the stanchion or the stall frame with a fixed guard to prevent the animal entering its head between this side of the stanchion and the adjacent stall upright when driven into the stall but such a construction prevented the animal from turning its head around on that side of the stanchion and thus hindered its comfort and free movement. It has also been the practice to mount movable guards on the stall frame but these mean additional equipment and have to be operated separately from the stanchion. To overcome the difficulties of these earlier constructions I have designed a guard which is carried by the stanchion and through simpler mechanism than that heretofore employed is operated on the operation of the movable side bar, the guard not interfering in any way with the free movement of the animal when held within the stanchion and opening to guarding position between the fixed side bar and the stall frame when the side bar is swung open.

The invention is further designed to provide a simple, efficient and sanitary combined stanchion and guard, the cost of the guard not adding materially to the cost of the stanchion due to the construction employed.

The invention further consists in the several features hereinafter set forth and more particularly defined by claims at the conclusion hereof.

In the drawings:

Figure 1 is a view of the device hung in the stall, the device being shown closed in full lines and open in dotted lines.

Fig. 2 is a vertical sectional view through the device, parts being broken away;

Fig. 3 is a plan view of the device taken on the line 3—3 of Fig. 2;

Fig. 4 is a section on the line 4—4 of Fig. 2.

Fig. 5 is a section on the line 5—5 of Fig. 2;

Fig. 6 is a section on the line 6—6 of Fig. 1.

In general the device comprises supporting means, a fixed side bar 8, a movable side side bar 9, means for locking the side bar closed, a guard, and means for operating said guard simultaneously with said movable side bar.

The fixed side bar 8 is preferably a curved channel bar having upper and lower inwardly curved ends 10 and 11.

The supporting means comprises means connected at the upper and lower ends of the side bar 8 for hanging the stanchion in the stall. The lower supporting means comprises a channel shaped fitting 12 fixedly secured to said side bar and having apertures 13 therein for receiving the restraining connection, such as the chain 14, which is anchored in the floor 14' of the stall. The upper supporting means comprises a guide member 15 and a connection between said member and the upper supporting member 16 of the stall frame. The guide member is provided with a longitudinally extending bore 17 and is split at its upper ends. The side bar 8 is secured to said member 15 by rivets 19.

The side bar 8, guide member 15 and fitting 12 constitute what may be termed the relatively fixed parts of the stanchion.

The connection between the member 15 and frame member 16 may be of any suitable construction and the usual chain connection between these parts may be used by connecting the chain to a bolt 18 passing through the split upper ends of the member 15 and to the member 16 but I prefer the yielding universal joint connection herein shown. This connection consists of a coupling, a member 21, fixedly secured to the guide 15 by the bolt 18, having a universal joint connection with said coupling, and means for yieldingly maintaining the parts of the joint in connection with each other. The coupling consists of mating members 22 each having a semi-cylindrical groove 23 therein, a curved recess portion 24 and an inwardly extending curved flange portion 25, said members being secured together by bolts 26. When assembled together the oppositely disposed grooves 23 form a bore for receiving the frame member 16, the portions 24 form a conoidal socket 28, and the flange portions 25 form an inwardly extending annular flange having an opening 29 therein. The member 21 is provided with a head 30 having a conoidal upper surface contacting with the socket 28 and a flat lower surface and the shank 31 of said member passes down through the opening 29 in the coupling and is provided with an eyed end 32 seated in registering recesses 33 in the split ends of the guide 15, the bolt 19 passing through said eyed end to rigidly secure the member 21 to the guide 15. The ball and socket joint between the coupling members 22 and the head 30 of the member 21 forms a universal joint. The means for yieldingly maintaining the parts of the joint in connection with each other comprises a coiled spring 34 surrounding the shank 31 of the member 21 and interposed between the flat surface of the head 31 and the annular flange of the coupling. This connection permits of the animal lurching forward or backward in the stall without injury and also allows a limited swinging movement of the stanchion in all directions, the spring serving to normally maintain the stanchion in proper position and the flange serving to limit the movement.

The movable side bar 9 has its upper portion bent round to form a guide 35 which is slidably mounted in the bore 17 of the guide member 15 and also within the channel of the bar 8, said guide being provided with a lug 36 to limit its outward movement. The side bar 9 is pivotally secured to the fitting 12 by a bolt 9', the guide 35 acting in conjunction with the member 15 serves to relieve the pivot bolt 9' of lateral strain.

The means for locking the side bar 9 closed comprises a latch 37 pivotally secured to bar 9 by a rivet 38 and having a forked portion 39 and a handle portion 40. The forked portion 39 is provided with locking hooks 41 adapted to engage laterally extending locking lugs 42 on the guide member 15. A spring 43 secured to the handle portion 40 and bearing against the top of the side bar serves to keep the hooks 41 in locking engagement with the lugs 42 and said hooks have curved front ends so that the side bar 9 may be automatically locked when it is moved to closed position.

The guard comprises a bar 44, preferably a T-bar, secured to the fitting 12 by a bolt 45, the web portion of the T fitting within the channel of the bar 8 and the flange thereof fitting over the channel of said bar to close the same when the stanchion is closed.

The means for operating the guard bar simultaneously with the movable side bar comprises a gearing connection between said bars. This gearing connection comprises intermeshing segmental gears 46 and 47 secured to the guard bar and movable side bar respectively, the pivot bolts 45 and 9' passing through said gears, the gears being housed within the channel fitting 12, to produce a simple, compact and sanitary construction. With this construction the inward or outward movement of the side bar 9 will through the gears 46 and 47 produce a corresponding movement of the guard bar 44.

The movable side bar 9 is provided with a forked fitting 48 adapted to engage the adjacent stall upright 49 and the guard bar 44 is provided with a forked fitting 50 adapted to engage the adjacent stall upright 51 when said bars are moved to open position, thus preventing movement of the stanchion when the animal is driven into the stall. Though the engagement of the guard bar with the adjacent stall upright is preferred, said guard bar may be moved into the space between the upright and the stanchion.

From the foregoing it will be noted that most of the parts of the stanchion are inclosed so as to provide a sanitary structure, and that the device consists of few parts.

With the construction above described when it is desired to open the stanchion, the operator unlocks the latch with one hand and with the same hand moves the movable side bar 9 outwardly to open position, whereupon the guard bar 44 is moved outwardly to guarding position, as shown in dotted lines in Fig. 1. This operation serves to effectually guard the space between the sides of the stanchion and the adjacent stall uprights by preventing the animal from entering its head between the stanchion and the stall upright when it is driven into the stall. On the movement of the movable side bar 9 to closed position the guard bar 44 moves inwardly to position within the channel of the side bar 9, the latch automatically lockingly engaging the lugs 42 on the member 15, the guard bar not interfering with the free movements of the animal within the stall, and the upper connection permitting limited swinging movement of the stanchion in all directions. By this construction practically no more effort is necessary to operate the guard than to operate the side bar and the operator cannot neglect to operate the guard on the opening and closing of the stanchion.

I am aware that the details of construction of the device are capable of considerable variation and modification and such changes in structure as come within the scope of the appended claims are within the spirit of my invention.

What I claim as my invention is:

1. In a stanchion, the combination, with the relatively fixed parts thereof, of a movable side bar pivotally secured to said fixed parts, a guard pivotally secured to said fixed parts, and a gearing connection between said guard and said movable side bar whereby said guard and side bar are moved simultaneously into or out of guarding position.

2. In a stanchion, the combination, with the relatively fixed parts thereof, of a movable side bar pivotally secured to said parts at its lower end, a guard pivotally secured to said parts at its lower end, and means connected to the lower ends of said guard and said side bar for simultaneous movement of said guard and side bar.

3. In a stanchion, the combination, with the relatively fixed parts thereof, of a movable side bar pivotally secured to said fixed parts and provided with a gear, and a guard pivotally secured to said fixed parts and provided with a gear meshing with the gear on the movable side bar whereby said guard is moved simultaneously with said side bar.

4. In a stanchion, the combination of a fixed side bar, a guide member connected to the upper end of said fixed bar, a movable side bar pivotally connected at its lower end to said fixed bar and having its upper end bent over to form a guide slidably mounted in said guide member, a guard pivotally connected to said fixed bar, means for moving said guard simultaneously with said movable side bar, and means for locking the side bar closed.

5. The combination, with a stall frame, of means for connecting a stanchion thereto, comprising a ball and socket joint, and a spring for yieldingly maintaining the ball against the socket.

6. The combination, with a stall frame, of means for swingingly supporting a stanchion therefrom, comprisng a coupling secured to the stall frame and provided with a socket and an inwardly extending annular flange below said socket, a member connected to the stanchion and having a headed end seated in the socket, and a spring interposed between said headed end and said flange for yieldingly maintaining said member in engagement with said socket.

7. In a stanchion, the combination with a channeled fixed bar, a movable side bar and means for locking the side bar closed, of a T-shaped guard bar pivotally connected to said fixed bar, means for moving said guard bar on the movement of the movable side bar, the web of the T-bar being housed within the channel of the fixed bar and the flange portions of the T-bar closing the channel when the stanchion in closed.

8. The combination, with a stall frame including uprights, of a stanchion mounted therein comprising a relatively fixed stanchion member, a swinging side bar provided with means for engaging the adjacent upright, a swinging guard provided with means for engaging the adjacent upright, means for operating said guard simultaneously with the operation of the side bar, and means locking the stanchion closed.

9. In a stanchion, the combination, with the relatively fixed parts including a fixed side bar, and a hollow fitting at the lower end thereof, of a swinging side bar and a swinging guard pivotally connected to said fixed parts, means housed within said fitting and operatively connecting said movable bar and guard together for simultaneous movement into and out of guarding position, and means for locking the stanchion closed.

10. In a stanchion, the combination, with the relatively fixed parts thereof including a guide member, of a movable side bar pivotally secured to said parts and provided with a guide slidably mounted in the guide member, a guard bar pivotally connected to said fixed parts, a gearing connection between said guard bar and movable side bar, and means for locking the side bar closed.

11. In a stanchion, the combination, of a fixed channel side bar having inwardly curved ends, a guide member secured to the upper curved end of the fixed bar, a channel fitting secured to the lower curved end of the fixed bar, a side bar pivotally secured to said fitting and provided with a guide slidably mounted in the fixed member, a guard bar pivotally connected to said fitting and seated within the channel bar, means housed within said fitting and connecting said movable side bar and guard bar for simultaneous movement, and means for locking the stanchion closed.

In testimony whereof I affix my signature.

LOUIS O. FRENCH.

Copies of this patent may be obtained for five cents each, by addressing the "Commissioner of Patents, Washington, D. C."